US012626182B2

(12) United States Patent
Chembakassery et al.

(10) Patent No.: US 12,626,182 B2
(45) Date of Patent: May 12, 2026

(54) MICROSERVICE COMPOSITIONS

(71) Applicant: International Business Machines Corporation, Armonk, NY (US)

(72) Inventors: Priyajith Chembakassery, Bangalore (IN); Dinup Padmanabha Pillai, Vignana Nagar (IN)

(73) Assignee: International Business Machines Corporation, Armonk, NY (US)

( * ) Notice: Subject to any disclaimer, the term of this patent is extended or adjusted under 35 U.S.C. 154(b) by 1122 days.

(21) Appl. No.: 17/223,445

(22) Filed: Apr. 6, 2021

(65) Prior Publication Data

US 2022/0318671 A1     Oct. 6, 2022

(51) Int. Cl.
*G06N 20/00*     (2019.01)
*G06F 18/211*     (2023.01)
*G06F 18/214*     (2023.01)
*H04L 67/51*     (2022.01)

(52) U.S. Cl.
CPC ........... *G06N 20/00* (2019.01); *G06F 18/211* (2023.01); *G06F 18/214* (2023.01); *H04L 67/51* (2022.05)

(58) Field of Classification Search
CPC ...... G06F 18/211; G06F 18/214; H04L 67/51; G06N 20/00
See application file for complete search history.

(56) References Cited

U.S. PATENT DOCUMENTS

| | | | | |
|---|---|---|---|---|
| 10,411,973 B2 * | 9/2019 | Brown | .................... | H04L 67/30 |
| 10,547,682 B2 * | 1/2020 | Suter | ....................... | G06F 9/547 |
| 10,924,370 B2 * | 2/2021 | Yenumulapalli | .... | G06F 11/3055 |
| 2005/0096960 A1 | 5/2005 | Plutowski | | |
| 2008/0244526 A1 | 10/2008 | Chang | | |

OTHER PUBLICATIONS

Khaleq AA, Ra I. Intelligent autoscaling of microservices in the cloud for real-time applications. IEEE Access. (Year: 2021).*
Kang, Peng et al., "Robust resource scaling of containerized microservices with probabilistic machine learning." 2020 IEEE/ACM 13th International Conference on Utility and Cloud Computing (UCC). IEEE (Year: 2020).*
Bellido, "Dynamic Composition of REST services." Published Feb. 11, 2007. 23 pages. In Concurso Latinoamericano De Tesis De Doctorado. https://eventos.spc.org.pe/clei2015/pdfs/142833.pdf.

(Continued)

*Primary Examiner* — Adam C Standke

(74) *Attorney, Agent, or Firm* — Seed Intellectual Property Law Group LLP

(57)     ABSTRACT

A processor may receive data regarding two or more microservices. The processor may identify, using an AI model, features of the two or more microservices. The processor may analyze the features of the two or more microservices relating to utilization contexts of the two or more microservices. The processor may classify a subset of the two or more microservices as a microservice bundle based on the analyzed features, where the microservice bundle includes two or more microservices configured to share microservice resources. The processor may output the classification of the microservice bundle.

20 Claims, 5 Drawing Sheets

100

(56) References Cited

OTHER PUBLICATIONS

Gao, et al., "Optimization of Microservice Composition Based on Artificial Immune Algorithm Considering Fuzziness and User Preference." Published Feb. 11, 2020. 20 pages. Published by IEEE. https://ieeexplore.ieee.org/stamp/stamp.jsp?arnumber=8979424.

Mell, et al., "The NIST Definition of Cloud Computing," Recommendations of the National Institute of Standards and Technology, U.S. Department of Commerce, Special Publication 800-145, Sep. 2011, 7 pgs.

Sun, et al., "A Formal Architecture Supporting Dynamic Composition of Web Services." Published Jul. 18, 2006. 6 pages. In International conference on Networking and Services (ICNS'06), pp. 48-48. Published by IEEE. Silicon Valley, CA, USA. https://ieeexplore.ieee.org/document/1690519.

* cited by examiner

100

200

Computer System

401

Processor
402

CPU
402A

CPU
402B

Memory Bus 403

CPU
402C

CPU
402D

Memory
404

Cache
424

RAM
422

Storage System
426

Programs 428

Modules 430

I/O Bus Interface 410

I/O Bus 408

Terminal
Interface
412

I/O Device
Interface
414

Storage
Interface
416

Network
Interface
418

MICROSERVICE COMPOSITIONS

BACKGROUND

The present disclosure relates generally to the field of modeling microservice compositions, and more specifically to bundling microservices to share resources.

Microservice architecture may allow the ability to decouple software versions and release different components of the software versions at different times. Microservice architecture may also allow the ability to scale components independently and to maintain security boundaries.

SUMMARY

Embodiments of the present disclosure include a method, computer program product, and system for bundling microservices to share resources.

A processor may receive data regarding two or more microservices. The processor may identify, using an AI model, features of the two or more microservices. The processor may analyze the features of the two or more microservices relating to utilization contexts of the two or more microservices. The processor may classify a subset of the two or more microservices as a microservice bundle based on the analyzed features, where the microservice bundle includes two or more microservices configured to share microservice resources. The processor may output the classification of the microservice bundle.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
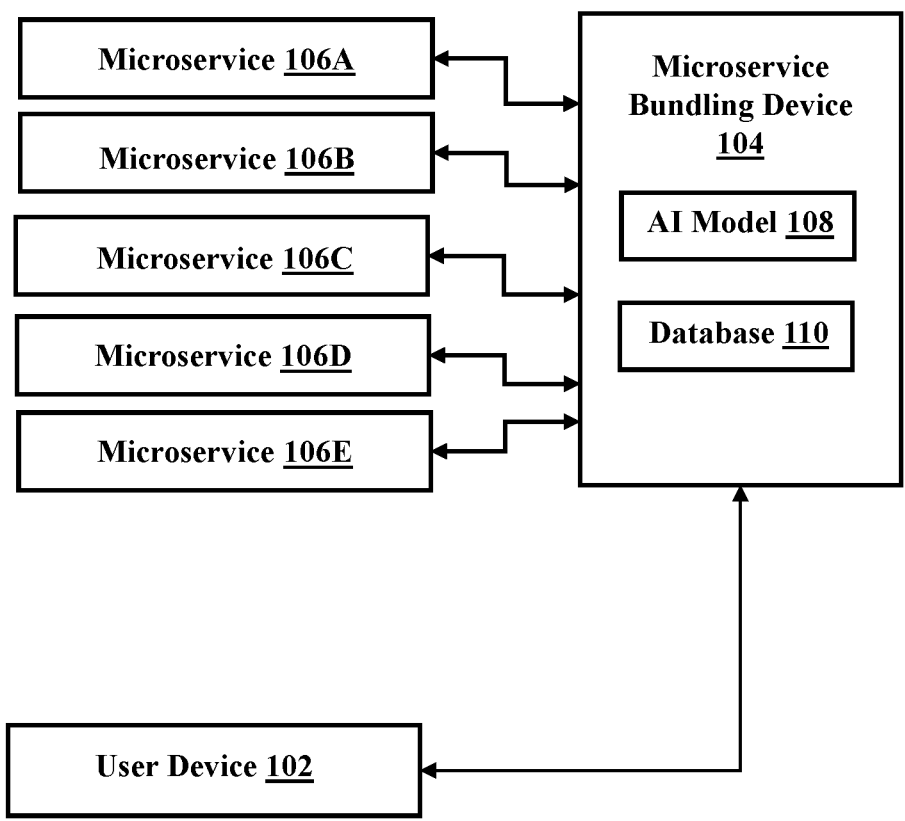
FIG. 1 is a block diagram of an exemplary system for bundling microservices to share resources, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of modeling microservice compositions, and more specifically to bundling microservices to share resources. While the present disclosure is not necessarily limited to such applications, various aspects of the disclosure may be appreciated through a discussion of various examples using this context.

In some embodiments, a processor may receive data regarding two or more microservices. In some embodiments, the two or more microservices may be part of a set of related microservices for one client. For example, the client may be a retailer, and the two microservices may relate to a payment service for receiving payment for goods sold and a catalog service for describing the goods to be sold. In some embodiments, the data may provide contextual background for how and when the microservices are needed (e.g., by the cloud no later than 4 p.m. each day, etc.).

In some embodiments, the data regarding the microservices may include a description of the service and information regarding resources used by service (e.g., compute intensive services, audio intensive services, memory intensive services, etc.). In some embodiments, the data may include information regarding service interdependencies, where one service is dependent on the output or the running of another service (e.g., a payment service dependent on information from a catalog service and a pricing service for a business). In some embodiments, the data may be in the form of metadata about the services. In some embodiments, the data may be regarding a time associated with when and/or how the services are used, including time of day, time of week, time of year, etc. In some embodiments, the data may be regarding the circumstances under which the services are used (e.g., a backup service utilized when demand for another service is very high). In some embodiments, the microservices may be intended for deployment. In some embodiments, the microservices may be part of a legacy system that was previously deployed.

In some embodiments, the processor may identify, using AI model, features of the two or more microservices. In some embodiments, the processor may classify a subset of the two or more microservices as a microservice bundle. In some embodiments, the subset of the two or more microservices classified as a microservice bundle may be, bundled because they are, and/or configured to share microservice resources. In some embodiments, the AI model may utilize machine learning, neural networks, or classification artificial intelligence. In some embodiments, the features of the two or more microservices may be features utilized to arrive at a classification of the microservices.

In some embodiments, the processor may analyze the features of the two or more microservices relating to utilization contexts of the two or more microservices. In some embodiments, the utilization contexts may relate to how and when the microservices are utilized, including the timing of the utilization (time of day, time of week, time of year), resource needs associated with the utilization (e.g., use of servers, processors, memory), contextual background information associated with the utilization (e.g., resource needs are greater when certain surrounding circumstances, such as a special sporting event, occur), description of the microservice (e.g., payment systems contextually relate to purchasing systems based on the functionalities they provide), circumstances under which the services are used (e.g., a backup service utilized when demand for another service is very high), pattern of usage (e.g., traffic patterns or other interactions between microservices), pattern of performance of the microservices, etc.

For example, the AI model may receive data regarding related microservices utilized by a retailer. A first microservice may relate to a catalog service that describes the goods to be sold to customers, a second microservice may relate to an order service that provides the services for a customer to order goods for purchase, and a third microservice may relate to a payment service that provides means for the customer to pay for the goods electronically. The AI model may be able to determine whether to combine the functionalities of any of the three microservices together or whether to keep the microservice functionalities independent. For example, the AI model determine that the second microservice related to ordering and the third microservice related to payment may be bundled together to combine resources of the microservices.

In some embodiments, the processor may output the classification of the microservice bundle. In some embodiments, the classification may be output to a user who oversees the architecture of the services. In some embodiments, the user may deploy the bundled microservices in bundles/clusters that share resources (e.g., share containers, shared servers, shared deployment on the same cloud server, etc.) and management of the microservices (e.g., management of appropriate resources for the microservices).

In some embodiments, the classification of the two or more microservices as a microservice bundle may include a time component. In some embodiments, the classification of the microservices as a microservice bundle may be associated with a time period (e.g., time of day, day of week, time of year, etc.). In some embodiments, the time component of the classification may relate to a contextual situation that relates to a time period. For example, two microservices may be bundled together to share resources during a particular time period (e.g., during a winter storm, during the holiday shopping period, on certain days of the week, after working hours on weekdays, during a time period before a special event, etc.). In some embodiments, the time component may be ascertained by training the AI model using historical and contextual data.

In some embodiments, the AI model may be trained using data regarding traffic patterns. In some embodiments, the AI model may be trained using data regarding traffic between the microservices that may be bundled together. For example, if there is a high traffic of messages between a first microservice and a second microservice during a particular contextual situation, the AI model may be trained to classify the first microservice and the second microservice as being part of a bundle of microservices that should have shared resources. In some embodiments, the data regarding traffic patterns may be associated with a contextual situation or time.

In some embodiments, the AI model may be trained using data regarding component interactions. In some embodiments, the AI model may be trained using data regarding component interactions between the microservices (e.g., the microservices that may be bundled together). In some embodiments, information regarding the interaction of one component of a microservice with another component of a microservice may be utilized to determine whether to bundle the microservices together to share resources.

For example, if a first microservice performs operations related to payment for goods and services and a second microservice performs operations related to security verification of the payments, the AI model may classify the first microservice and the second microservice as being part of a bundle of microservices that should have shared resources. In some embodiments, the component interactions may be correlated with errors or performance failures for one or both of the microservices when they share resources. In some embodiments, the AI model may be trained to output a classification for those microservices that recommends that the microservices should not be bundled together. In some embodiments, the data regarding component interactions may be associated with a contextual situation or time.

In some embodiments, the AI model may be trained using data regarding resource utilization. In some embodiments, the AI model may be trained using data regarding resource utilization of two or more microservices. In some embodiments, information regarding the utilization of resources (e.g., servers, processors, memory) of the two or more microservices may be utilized to determine whether to bundle the microservices together to share resources. For example, if a first microservice utilizes a high amount of resources during certain situations and a second microservice also utilizes a high amount of resources during the same or similar situations, the AI model may be trained to classify the first microservice and the second microservice as microservices that should be bundled together to share resources. In some embodiments, the AI model may output that two microservices that utilize high amounts of resources under the same or similar circumstances should not be bundled together to share resources because when each microservice requires high resources independent resource allotment may lead to less errors or downtime for the services. In some embodiments, the data regarding resource utilization may be associated with a contextual situation or time.

In some embodiments, the AI model may be trained using data regarding criticality of the microservices. In some embodiments, the AI model may be trained using data regarding the criticality of two or more microservices (e.g., based on the function that the microservice provides, observed errors and outages captured in historical data, etc.). In some embodiments, information regarding the criticality of the two or more microservices may be utilized to determine whether to bundle the microservices together to share resources.

For example, if the operation of a first microservice is very critical during certain contextual scenarios and if the operation of a second microservice is also critical during the same or similar contextual scenarios, the AI model may classify the first microservice and the second microservice as microservices that should not be bundled together to share resources. The AI model may classify that the two microservices should have independent resources in order to prevent both microservices becoming nonoperational during the same time because of issues with shared resources. In some embodiments, the AI model may output that two microservices that are not critical under the same or similar circumstances should be bundled together to share resources because the consequences of both microservices losing operation at the same time are not severe. In some embodiments, the data regarding the criticality of the microservices may be associated with a contextual situation or time.

In some embodiments, the AI model may be trained using data regarding a roll out of a change in a microservice. In some embodiments, information regarding the roll out of a change in a microservice may be utilized to determine whether to bundle microservices together to share resources. For example, if a roll out of a change is planned for a first microservice, the AI model may classify that the first microservice and a second microservice should not be bundled together to share resources. The AI model may classify that the two microservices should have independent resources in order to prevent both microservices becoming nonoperational during the same time because of issues with the roll out of a change for the first microservice. In some embodiments, the AI model may output that two microservices undergoing the change roll out should be bundled together to share resources because the change may affect common systems that could benefit from shared resources. In some embodiments, the data regarding the roll out of a change in a microservice may be associated with a contextual situation or time.

In some embodiments, the data utilized to train the AI model to identify different contextual situations affecting whether two or more microservice should be bundled together may come from social media or news sources. In some embodiments, social media or news source data may be utilized to learn about the occurrence of a contextual situation that may affect the resource needs of various components of a client's services. For example, based on social media data or news source data, the arrival of a winter storm may be predicted. The AI model may predict that during the winter storm more online, rather than in-person, purchases may be made by customers. Therefore, the AI model may determine that the ecommerce services related to cataloging goods, ordering goods, and paying for goods of a particular business may have greater demands on them and should not be bundled.

In some embodiments, the data used to train the AI model may come from a log management system that is a repository regarding the behavior and performance of the microservices. The log management system may collect information about how a system is behaving and if there are any issues with the system (e.g., if an application is working correctly). For example, the catalog and payments systems for a client may be operating with a combined architecture. A server may go down because of an issue with the catalogue system, and both the catalogue system and the payment system may be affected. The AI model may be able to learn from this information. In some embodiments, the log management system may include information related to down or error messages, error rates, application traces, log messages, error codes, exception codes, etc. In some embodiments, the log management system may include information from application logs, middleware logs, platform logs, HTTP access logs, network logs, etc.

In some embodiments, the data used to train the AI model may come from monitoring systems that collect system metrics (e.g., real-time utilization of CPU cycles and memory). For example, the network metrics may provide information about how catalog services and payment services are interacting with each other using APIs. The monitoring system may collect information regarding how frequently the services are interacting with each other and what the traffic is between the services. For example, if two services are interacting with each other heavily, there may be some benefit to deploying the two systems to have a combined architecture where they share resources (e.g., increasing computing efficiency). In some embodiments, the data used to train the AI model may come from platform metrics that provide information regarding the cluster (e.g., kubernetes cluster or open shift cluster) in which an application is deployed. In some embodiments, the platform metrics may provide information about how the cluster is functioning, whether the cluster can handle an increased load, and how the cluster is reacting to the current composition of the microservice. In some embodiments, the monitoring system may obtain container metrics, application metrics, network metrics, platform metrics, or information regarding change/fix rollout events. In some embodiments, the metrics may include time-series data that relate to the health and interaction of microservices.

Referring now to FIG. 1, a block diagram of a system 100 for bundling microservices to share resources is illustrated. System 100 includes a user device 102, a microservice bundling device 104, and microservices 106A-106E. The microservice bundling device 104 is configured to be in communication with microservices 106A-106E. The microservice bundling device 104 includes an AI model 108 and a database 110 for storing data associated with time, contextual situations, traffic patterns, component interactions, resource utilization, microservice criticality, and change rollouts in microservices. In some embodiments, the user device 102 and the microservice bundling device 104 may be any devices that contain a processor configured to perform one or more of the functions or steps described in this disclosure.

In some embodiments, the microservice bundling device 104 receives data regarding microservices 106A-106E from the microservices or from a repository of information about the microservices. The microservice bundling device 104 identifies features of the microservices 106A-106E using the AI model 108. The microservice bundling device 104 analyzes the features of the two or more microservices relating to utilization contexts of the two or more microservices. The microservice bundling device 104 classifies a subset (e.g., microservice 106A and 106B) of the microservices 106A-106E as a microservice bundle. The microservice bundling device 104 then outputs the classification of the microservice bundle (e.g., classification of microservices 106A and 106B as a suggested microservice bundle) to a user device 102. In some embodiments, the user device 102 may receive the classification and make the changes to the architecture of microservice 106A and 106B so that they share resources. In some embodiments, the microservice bundling device 104 may provide a recommendation regarding the architecture of microservice 106A and 106B to the user device 102 and make the changes to the architecture of microservice 106A and 106B.

Figure 2:
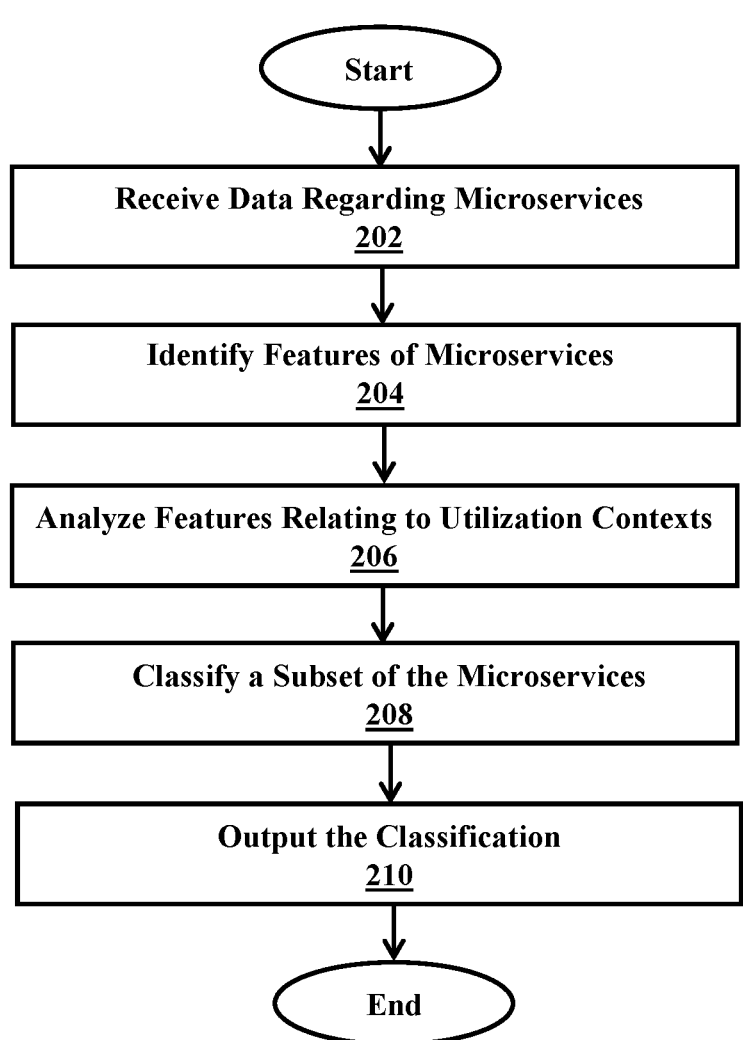
FIG. 2 is a flowchart of an exemplary method for bundling microservices to share resources, in accordance with aspects of the present disclosure.

Referring now to FIG. 2, illustrated is a flowchart of an exemplary method 200 for bundling microservices to share resources, in accordance with embodiments of the present disclosure. In some embodiments, a processor of a system may perform the operations of the method 200. In some embodiments, method 200 begins at operation 202. At operation 202, the processor receives data regarding two or more microservices. In some embodiments, method 200 proceeds to operation 204, where the processor identifies, using an AI model, features of the two or more microservices. In some embodiments, method 200 proceeds to operation 206. At operation 206, the processor analyzes the features of the two or more microservices relating to utilization contexts of the two or more microservices. In some embodiments, method 200 proceeds to operation 208. At operation 208, the processor classifies a subset of the two or more microservices as a microservice bundle based on the analyzed features. In some embodiments, the microservice bundle includes two or more microservices configured to share microservice resources. In some embodiments, method 200 proceeds to operation 210. At operation 210, the processor outputs the classification of the microservice bundle.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
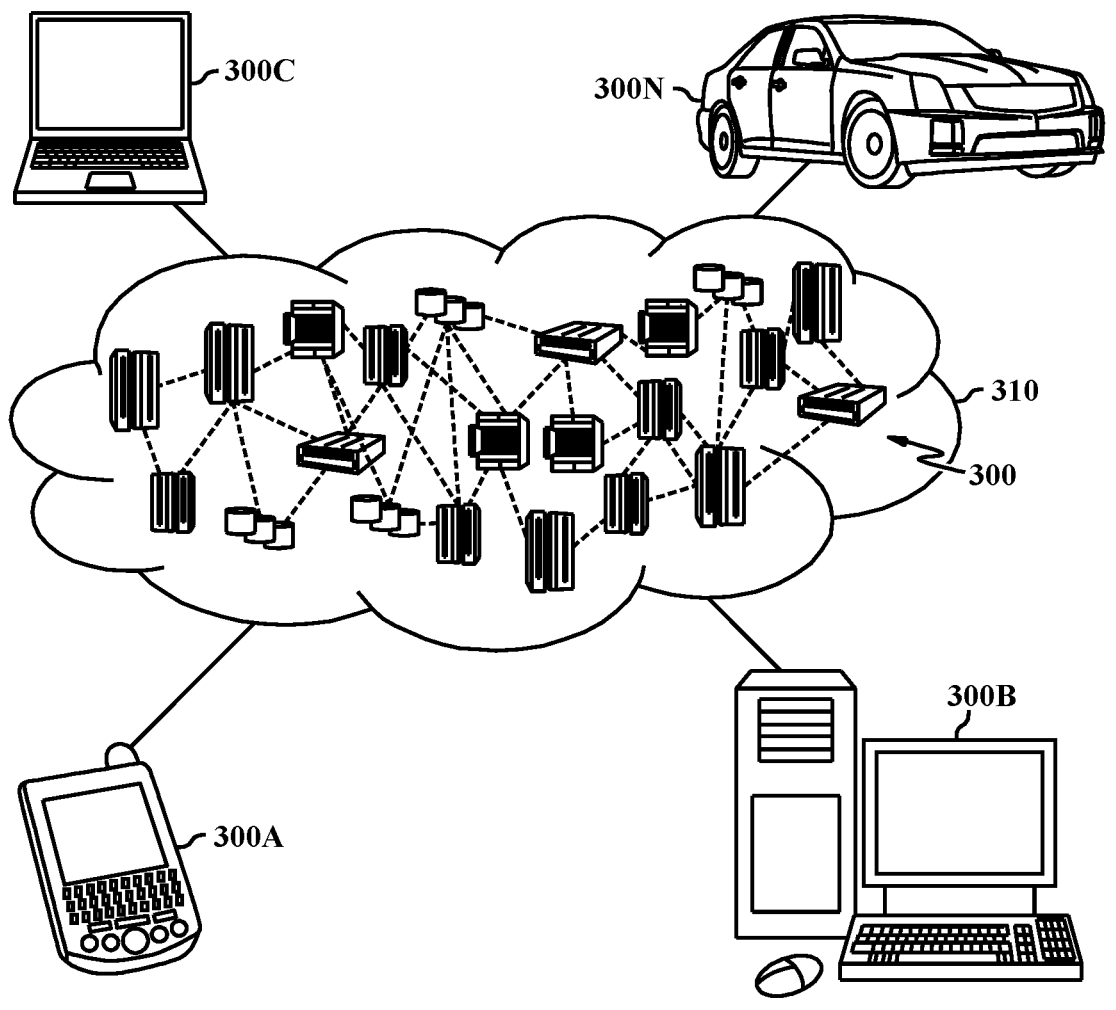
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
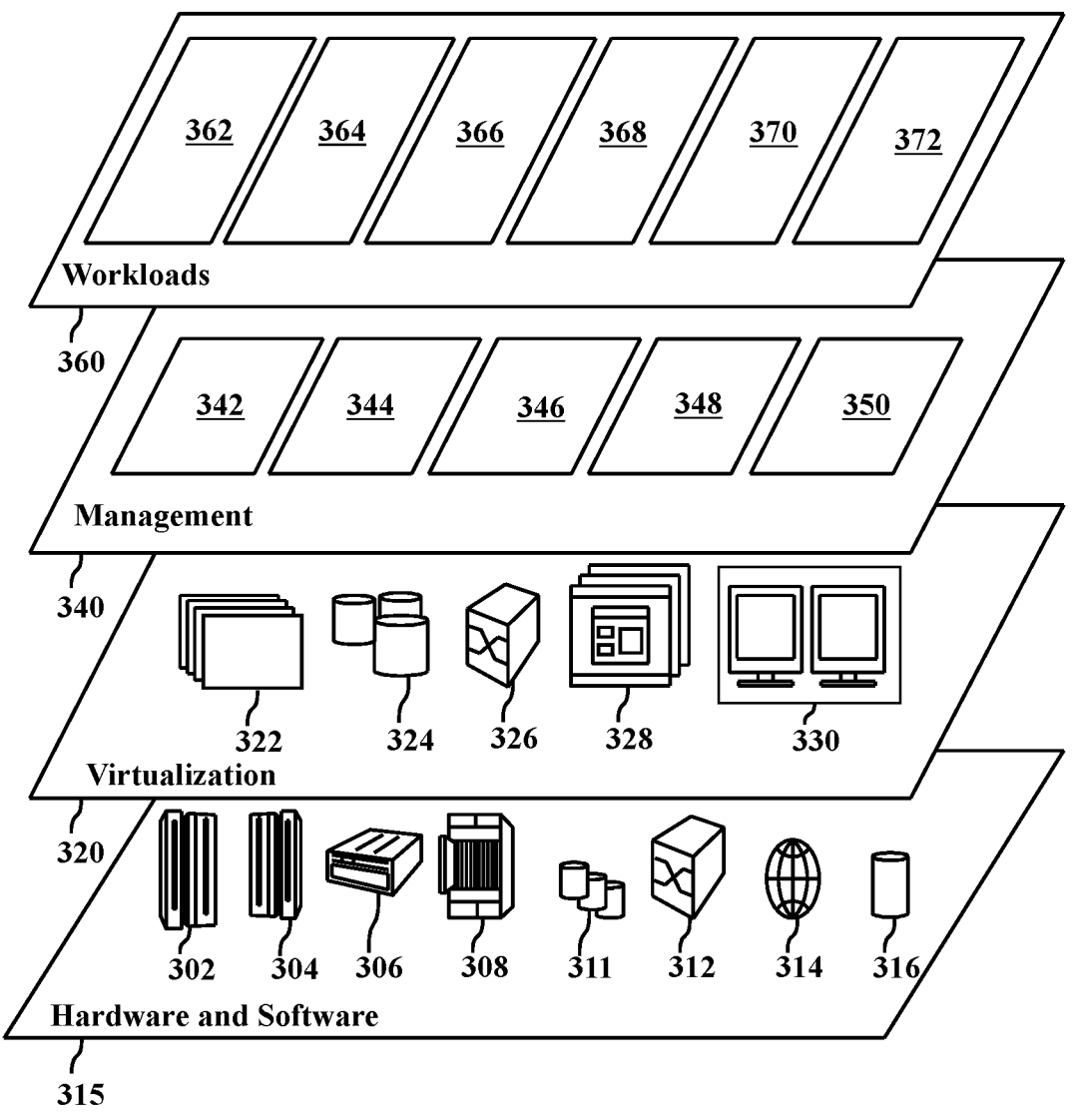
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and bundling microservices to share resources 372.

Figure 4:
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media)

having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:

receiving, by a processor, microservice data regarding two or more microservices, wherein said microservice data includes service dependency data and microservice use data;

determining a utilization context associated with each the two or more microservices, wherein the utilization context includes a time period of utilization of each of the two or more microservices, resource needs associated with the utilization of each of the two or more microservices, a contextual background associated with the utilization of each of the two or more microservices, and a pattern of performance associated with the utilization of each of the two or more microservices;

analyzing, using an AI model, the microservice data and utilization context to determine features of the two or more microservices relating to utilization contexts of the two or more microservices;

combining a subset of the two or more microservices as a microservice bundle based on the features and a classification of the AI model, wherein the microservice bundle includes two or more microservices configured to share microservice resources, comprising:

responsive to a roll out of a change for a first microservice, determining a second microservice that will become nonoperational based on the roll out of change for the first microservice and an impact of the roll out of change on shared resources; and unbundling the first microservice and the second microservice, wherein the first microservice and second microservice have independent resources; and allocating resources to the microservice bundle based on the combined subset of the two or more microservices.

2. The method of claim 1, wherein the classification of the two or more microservices as a bundle includes a time component.

3. The method of claim 1, wherein the AI model is trained using data regarding traffic patterns between the two or more microservices.

4. The method of claim 1, wherein the AI model is trained using data regarding component interactions of microservices.

5. The method of claim 1, wherein the AI model is trained using data regarding resource utilization of microservices.

6. The method of claim 1, wherein the AI model is trained using data regarding criticality of microservices.

7. The method of claim 1, wherein the AI model is trained using data regarding a roll out of a change in a microservice.

8. A system comprising:

a memory; and a processor in communication with the memory, the processor being configured to perform operations comprising:

receiving microservice data regarding two or more microservices, wherein said microservice data includes service dependency data and microservice use data;

determining a utilization context associated with each the two or more microservices, wherein the utilization context includes a time period of utilization of each of the two or more microservices, resource needs associated with the utilization of each of the two or more microservices, a contextual background associated with the utilization of each of the two or more microservices, and a pattern of performance associated with the utilization of each of the two or more microservices;

analyzing, using an AI model, the microservice data and utilization context to determine features of the two or more microservices relating to utilization contexts of the two or more microservices;

combining a subset of the two or more microservices as a microservice bundle based on the features and a classification of the AI model, wherein the microservice bundle includes two or more microservices configured to share microservice resources, comprising:

responsive to a roll out of a change for a first microservice, determining a second microservice that will become nonoperational based on the roll out of change for the first microservice and an impact of the roll out of change on shared resources; and unbundling the first microservice and the second microservice, wherein the first microservice and second microservice have independent resources; and allocating resources to the microservice bundle based on the combined subset of the two or more microservices.

9. The system of claim 8, wherein the classification of the two or more microservices as a bundle includes a time component.

10. The system of claim 8, wherein the AI model is trained using data regarding traffic patterns between the two or more microservices.

11. The system of claim 8, wherein the AI model is trained using data regarding component interactions of microservices.

12. The system of claim 8, wherein the AI model is trained using data regarding resource utilization of microservices.

13. The system of claim 8, wherein the AI model is trained using data regarding criticality of microservices.

14. The system of claim 8, wherein the AI model is trained using data regarding a roll out of a change in a microservice.

15. A computer program product comprising a computer readable storage medium having program instructions embodied therewith, the program instructions executable by a processor to cause the processor to perform operations, the operations comprising:

receiving microservice data regarding two or more microservices, wherein said microservice data includes service dependency data and microservice use data;

determining a utilization context associated with each the two or more microservices, wherein the utilization context includes a time period of utilization of each of the two or more microservices, resource needs associated with the utilization of each of the two or more microservices, a contextual background associated with the utilization of each of the two or more microservices, and a pattern of performance associated with the utilization of each of the two or more microservices;

analyzing, using an AI model, the microservice data and utilization context to determine features of the two or more microservices relating to utilization contexts of the two or more microservices;

combining a subset of the two or more microservices as a microservice bundle based on the features and a classification of the AI model, wherein the microservice bundle includes two or more microservices configured to share microservice resources, comprising:

responsive to a roll out of a change for a first microservice, determining a second microservice that will become nonoperational based on the roll out of change for the first microservice and an impact of the roll out of change on shared resources; and unbundling the first microservice and the second microservice, wherein the first microservice and second microservice have independent resources; and allocating resources to the microservice bundle based on the combined subset of the two or more microservices.

16. The computer program product of claim 15, wherein the classification of the two or more microservices as a bundle includes a time component.

17. The computer program product of claim 15, wherein the AI model is trained using data regarding traffic patterns between the two or more microservices.

18. The computer program product of claim 15, wherein the AI model is trained using data regarding component interactions of microservices.

19. The computer program product of claim 15, wherein the AI model is trained using data regarding resource utilization of microservices.

20. The computer program product of claim 15, wherein the AI model is trained using data regarding criticality of microservices.

* * * * *